US008582556B2

(12) United States Patent
Stern et al.

(10) Patent No.: US 8,582,556 B2
(45) Date of Patent: Nov. 12, 2013

(54) METHOD AND APPARATUS FOR MAINTAINING STATE INFORMATION ON A CLIENT DEVICE CONFIGURED FOR VOIP COMMUNICATION

(75) Inventors: Benjamin J. Stern, Morris Township, NJ (US); Narendra K. Gupta, Dayton, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1608 days.

(21) Appl. No.: 11/447,445

(22) Filed: Jun. 6, 2006

(65) Prior Publication Data

US 2007/0280218 A1    Dec. 6, 2007

(51) Int. Cl.
*H04M 3/42* (2006.01)
*H04L 12/66* (2006.01)
*H04L 29/06* (2006.01)
*G06F 15/16* (2006.01)

(52) U.S. Cl.
USPC .......... 370/352; 379/201.02; 379/201.05; 709/228; 709/229; 726/14

(58) Field of Classification Search
USPC ......... 370/352–356, 230, 252, 259, 349, 389, 370/392, 395.2, 493–496; 379/265.02, 379/265.09, 266.1, 265.01, 265.1, 265.11, 379/266.07, 211.02, 201.01, 201.02, 379/201.07–201.09; 709/227–229, 709/222–225; 455/414.1
See application file for complete search history.

(56) References Cited

U.S. PATENT DOCUMENTS

| 6,332,163 | B1 * | 12/2001 | Bowman-Amuah | 709/231 |
| 6,385,309 | B1 * | 5/2002 | Bennett et al. | 379/93.25 |
| 6,701,366 | B1 * | 3/2004 | Kallas et al. | 709/227 |
| 6,778,653 | B1 * | 8/2004 | Kallas et al. | 379/201.02 |
| 7,206,932 | B1 * | 4/2007 | Kirchhoff | 713/152 |
| 7,290,160 | B2 * | 10/2007 | Walker | 713/401 |
| 7,376,740 | B1 * | 5/2008 | Porter et al. | 709/227 |
| 7,496,054 | B2 * | 2/2009 | Taylor | 370/255 |

(Continued)

FOREIGN PATENT DOCUMENTS

EP    1248439    10/2002

OTHER PUBLICATIONS

Marwah, M., et al., "Efficient, scalable migration of IP telephony calls for enhanced fault-tolerance", Computer Communications and Networks, 2005. ICCN 2005, Proceedings 14th International Conference, San Diego, CA, Oct. 17, 2005, pp. 517-522.

(Continued)

*Primary Examiner* — Asad Nawaz
*Assistant Examiner* — Wutchung Chu (57) ABSTRACT

Method and apparatus for maintaining state information on a client device configured for voice-over-internet protocol (VOIP) communication is described. In one example, a VOIP call between the client device and an endpoint device through a packet network is established. State information is sent from the client device to the endpoint device during the VOIP call. The state object having the state information embedded therein is received from the endpoint device at the client device. The state object is stored in the client device. The state object may be retrieved from the client device during the VOIP call or a subsequent VOIP call in response to an authenticated request from the endpoint device. Alternatively, the state object may be retrieved from the client device during a subsequent web session in response to an authenticated request from a host.

14 Claims, 5 Drawing Sheets

(56) References Cited

U.S. PATENT DOCUMENTS

| | | | |
|---|---|---|---|
| 7,653,938 B1* | 1/2010 | Touitou et al. | 726/14 |
| 7,738,646 B2* | 6/2010 | Sundaram et al. | 379/220.01 |
| 7,813,336 B2* | 10/2010 | Shigeta | 370/354 |
| 8,024,401 B1* | 9/2011 | Gurbani et al. | 709/204 |
| 2001/0056487 A1* | 12/2001 | Yoo | 709/225 |
| 2002/0055973 A1* | 5/2002 | Low et al. | 709/204 |
| 2002/0101853 A1* | 8/2002 | Siegrist et al. | 370/352 |
| 2002/0124100 A1* | 9/2002 | Adams | 709/232 |
| 2002/0147818 A1* | 10/2002 | Wengrovitz | 709/228 |
| 2003/0110274 A1* | 6/2003 | Pazi et al. | 709/229 |
| 2003/0161448 A1* | 8/2003 | Parolkar et al. | 379/88.17 |
| 2003/0223571 A1* | 12/2003 | Dezonno | 379/265.09 |
| 2005/0141694 A1* | 6/2005 | Wengrovitz | 379/265.09 |
| 2006/0153357 A1* | 7/2006 | Acharya et al. | 379/266.01 |
| 2006/0174327 A1* | 8/2006 | Song et al. | 726/3 |
| 2007/0106670 A1* | 5/2007 | Yoakum et al. | 707/10 |
| 2007/0116239 A1* | 5/2007 | Jacobi et al. | 379/265.02 |
| 2007/0271599 A1 | 11/2007 | Rosenstein | |

OTHER PUBLICATIONS

International Search Report and Written Opinion for PCT/US2007/070088.

EP Examination Report for EP 07 797 931.8, Aug. 18, 2009, copy consists of 5 pages.

International Preliminary Report on Patentability for PCT/US07/70088; May 10, 2010, copy consists of 6 pages.

\* cited by examiner

МЕТHOD AND APPARATUS FOR MAINTAINING STATE INFORMATION ON A CLIENT DEVICE CONFIGURED FOR VOIP COMMUNICATION

BACKGROUND OF THE INVENTION

1. Field of the Invention

Embodiments of the present invention generally relate to telecommunications systems and, more particularly, to a method and apparatus for maintaining state information on a client device configured for voice-over-internet protocol (VOIP) communication.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

In a VOIP network, voice conversations are routed over the Internet or through any other internet protocol (IP)-based network. The voice data flows over a general-purpose packet-switched network, rather than dedicated legacy circuit-switched telephony transmission lines. VOIP calls can be launched from devices that have interactive capabilities well beyond simple voice transmit/receive. Notably, some VOIP subscribers desire the ability to securely store and retrieve information to and from VOIP client devices during VOIP sessions. For example, it may be advantageous to securely store and use login, profile, history, and other types of information for subscribers engaging in automated and/or live voice interactions. Accordingly, there exists a need in the art for a method and apparatus for maintaining state information on a client device configured for VOIP communication.

SUMMARY OF THE INVENTION

Method and apparatus for maintaining state information on a client device configured for voice-over-internet protocol (VOIP) communication is described. In one embodiment, a VOIP call between the client device and an endpoint device through a packet network is established. State information is sent from the client device to the endpoint device during the VOIP call. The state object having the state information embedded therein is received from the endpoint device at the client device. The state object is stored in the client device. The state object may be retrieved from the client device during the VOIP call or a subsequent VOIP call in response to an authenticated request from the endpoint device. Alternatively, the state object may be retrieved from the client device during a subsequent web session in response to an authenticated request from a host.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
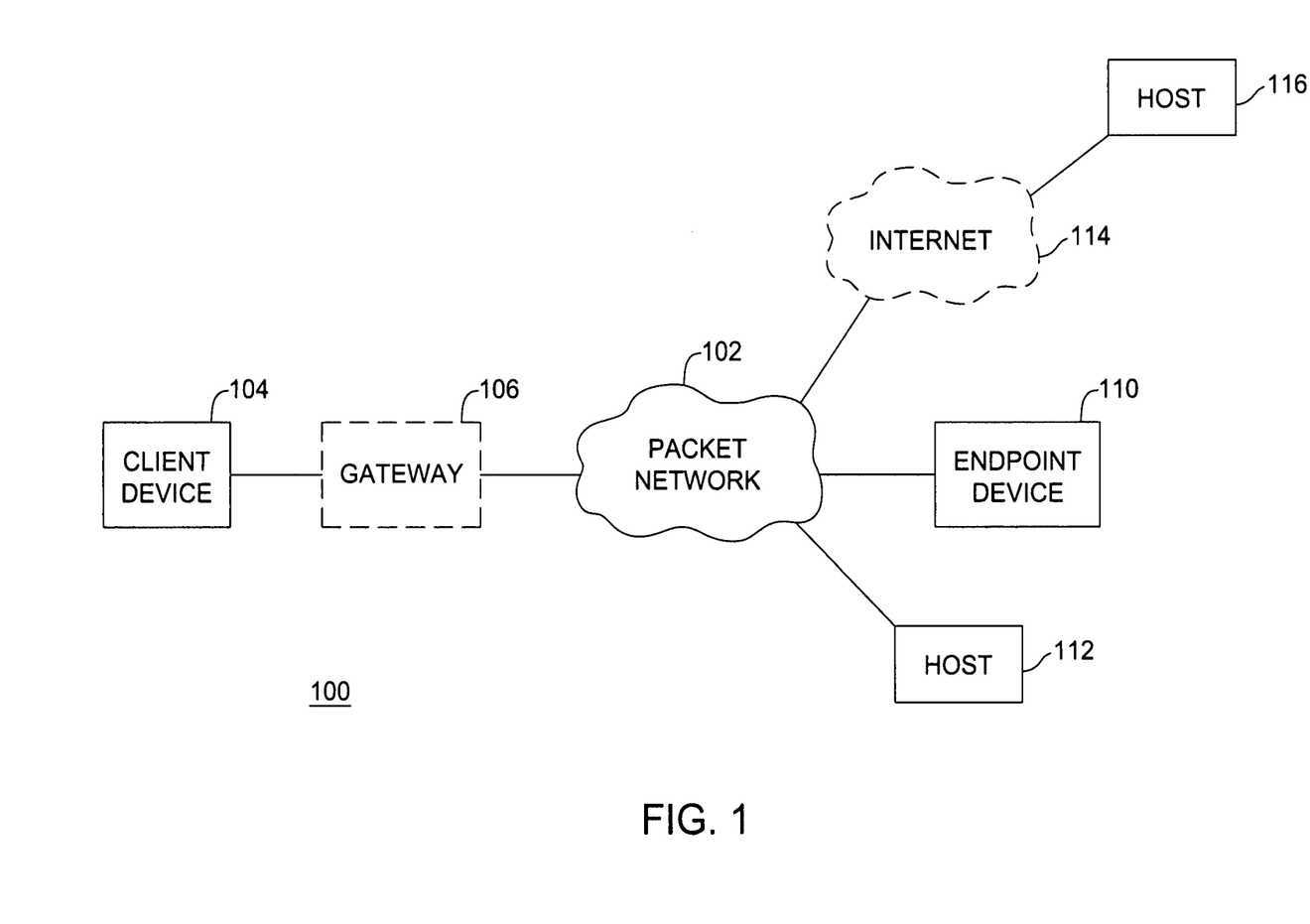
FIG. 1 is a block diagram depicting an exemplary embodiment of a communication system.

FIG. 1 is a block diagram depicting an exemplary embodiment of a communication system 100. The communication system 100 includes a packet network 102, a client device 104, and an endpoint device 110. The packet network 102 may comprise one or more of an internet protocol (IP) network, asynchronous transfer mode (ATM) network, frame relay network, and the like. A packet network is broadly defined as a network that uses a protocol, such as IP, to exchange data packets. Thus, a voice-over-internet protocol (VOIP) network, or a SOIP (Service over internet protocol) network is considered a packet network. In one embodiment, the packet network 102 may include an Internet Protocol/Multi-Protocol. Label Switching (IP/MPLS) based core backbone network for supported VOIP services. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The client device 104 is configured to VOIP communication through the packet network 102. The client device 104 may be either time division multiplexing (TDM) based or IP based. TDM-based clients typically comprise TDM phones or the like. IP based clients typically comprise IP phones, personal computers (PCs), personal digital assistants (PDAs), and the like. In some cases, the client device 104 may be directly coupled to the packet network. For example, the client device may include a modem (not shown) for interfacing the packet network 102. In other cases, the client device 104 is coupled to the packet network 102 through a gateway 106. The gateway 106 is used to provide the necessary interworking functions between the client device 104 and the packet network 102. The gateway 106 comprises, for example, a router, access point, or the like. Although only one client device is shown, it is to be understood that a plurality of client devices may be served by the gateway 106.

Figure 2:
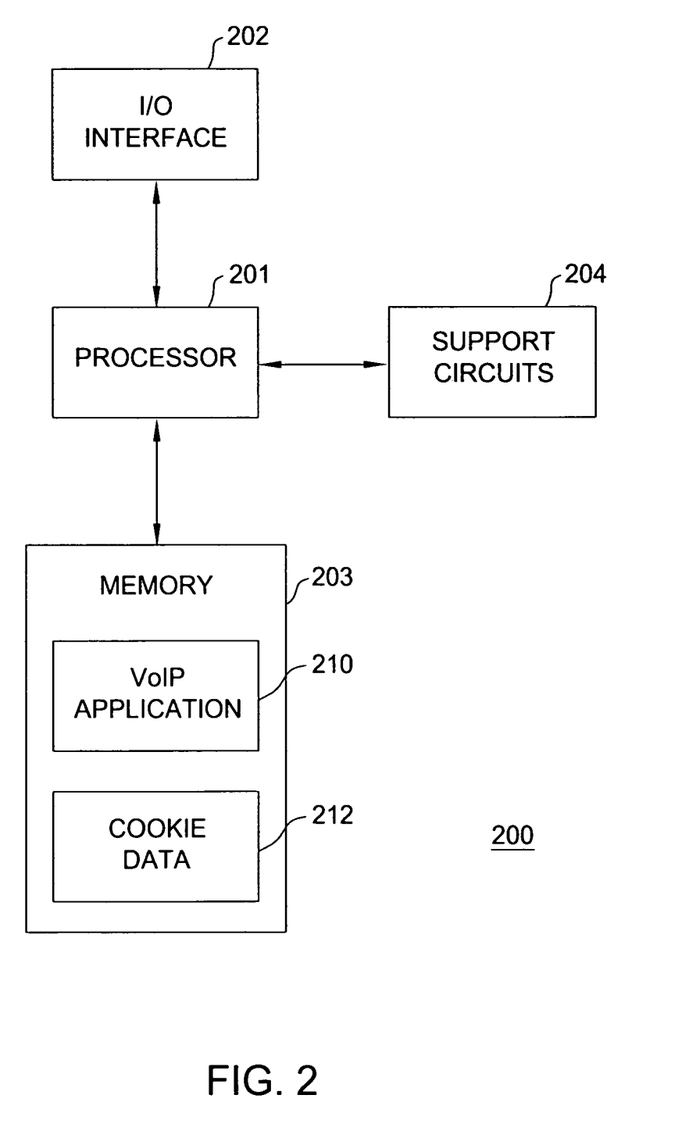
FIG. 2 is a block diagram of a network element constructed in accordance with one or more aspects of the invention.

FIG. 2 is a block diagram of a network element 200 constructed in accordance with one or more aspects of the invention. The network element 200 may be used to implement the client device 104 or the gateway 106 of FIG. 1. The network element 200 includes a processor 201, a memory 203, various support circuits 204, and an I/O interface 202. The processor 201 may be any type of microprocessor known in the art. The support circuits 204 for the processor 201 include conventional cache, power supplies, clock circuits, data registers, I/O interfaces, and the like. The I/O interface 202 may be directly coupled to the memory 203 or coupled through the processor(s) 201. In one embodiment, the I/O interface 202 may be coupled to various input devices 212 and output devices 211, such as a conventional keyboard, mouse, printer, and the like.

The memory 203 stores processor-executable instructions and/or data that may be executed by and/or used by the processor 201 as described further below. These processor-executable instructions may comprise hardware, firmware, software, and the like, or some combination thereof. Modules having processor-executable instructions that are stored in the memory 203 include VOIP application 214. Data stored in the memory 203 includes cookie data 216. The functions performed by the client device 104 and/or the gateway 106 described above may be implemented by the VOIP application 214. The memory 203 may include one or more of the following random access memory, read only memory, magneto-resistive read/write memory, optical read/write memory, cache memory, magnetic read/write memory, and the like, as well as signal-bearing media as described below.

Although one or more aspects of the invention are disclosed as being implemented as processor(s) executing a software program, those skilled in the art will appreciate that the invention may be implemented in hardware, software, or a combination of hardware and software. Such implementations may include a number of processors independently executing various programs and dedicated hardware, such as ASICs. In one embodiment, the network element 200 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 203.

Referring to FIGS. 1 and 2, in one embodiment, the client device 104 is configured to maintain state objects associated with VOIP interactions. The state objects may comprise "cookies." Cookies are a general mechanism that server side connections can use to both store and retrieve information from the client side of the connection. The present embodiment may be understood with reference to the following example. Assume the client device establishes a VOIP call to the endpoint device 110 through the packet network 102. The endpoint device 110 may comprise an interactive voice response (IVR) system, for example, an IVR catalog, ordering application, or the like. Alternatively, the endpoint device 110 may comprise a customer service representative (CSR) support system, such as a computer that implements a telephone to give a CSR more control of calls. The endpoint device 110 may also comprise a VOIP phone with features that allow it to read and write cookies either automatically or under user control. It is to be understood that the endpoint device 110 may be any type of device or system.

During the VOIP call, the endpoint device 110 maintains state information associated with the client device. The state information may comprise various types of data, such as a user's name, a login name, user preferences, and the like. The endpoint device 110 is configured to embed the state information in a VOIP cookie or "VCookie." The state information is embedded as text within the VCookie. The text may include pairs of names and values. For example, a name "PERSON_NAME" may be assigned the value "John Smith" (e.g., PERSON_NAME=John Smith). The VCookie may store an identifier associated with a particular endpoint device. For example, the VCookie may include a uniform resource identifier (URI) to which the VOIP call was placed, a North American Numbering Plan (NANP) number, or the like. The VCookie may include various other types of information, such as an expiration date. In one embodiment, the VCookie may conform to the cookie specification defined in RFC 2965 set forth by the IETF.

The endpoint device 110 returns the VCookie to the client device 104. For example, the VOIP call may be established using session initiation protocol (SIP) as the VOIP signaling protocol. SIP is a standard protocol for initiating, modifying, and terminating an interactive user session that involves multimedia elements and is a common protocol used for VOIP signaling. The VCookie may be sent to the client device 104 from the endpoint device 110 in a SIP message. In one embodiment, the VCookie is sent through a SIP INFO method. The SIP INFO method is an extension to SIP defined in RFC 2976 set forth by the Internet Engineering Task Force (IETF). The intent of the INFO method is to allow for the carrying of session related control information that is generated during a session. The INFO method may be adapted to carry the state information to the client device 104. Those skilled in the art will appreciate that the Vcookie may be sent to the client device 104 using other mechanisms, such as a newly defined method within SIP for such purpose, a parallel control channel, and the like. For example, the VCookie may be sent using other communication protocols, such as H.323, media gateway control protocol (MGCP), and the like. Notably, while the call may be established using one type of communication protocol, such as SIP, the VCookie may be sent using another type of protocol, such as H.323.

The client device 104 stores the VCookie, for example, in a cookie directory (e.g., the cookie data 216). At a later time, either in the same or subsequent VOIP call, the endpoint device 110 sends a request for the VCookie to the client device 104. The client device 104 verifies the authenticity of the request before sending the VCookie to the endpoint device 110. To verify authenticity, the client device 104 may compare an identifier associated with the endpoint device 110 with the identifier stored in the VCookie. If the client device 104 initiated the call, the client device 104 is aware of the identifier for the endpoint device 110, since the call was placed to that identifier. If the client device 104 is receiving the call, the client device 104 may be aware of the identifier for the endpoint device 110 from call setup. The request is classified as being authentic if the identifiers match. Otherwise, the client device 104 rejects the request. For example, only the endpoint device having a URI stored in the VCookie can access that VCookie.

In another embodiment, the state objects stored in the client device 104 may be used for both VOIP and web interactions. For example, assume that the client device 104 is a PC or other type of device configured to communication with the Internet. Notably, the client device 104 may be configured for web communication with a host 112 through the packet network 102. Alternatively, the packet network 102 may be coupled to Internet 114. The client device 104 may be configured for web communication with a host 116 through the packet network 102 and the Internet 114. In any case, the client device 104 may store one or more cookies through web interactions with the host 116 and/or the host 112. For example, the client device 104 may be used to visit the Acme Catalog website to make a purchase. During the web interactions, the Acme Catalog web server running on the host writes one or more cookies to the client device 104. The cookie(s) may conform the cookie specification defined in RFC 2965.

Subsequently, the client device 104 may establish a VOIP call with the endpoint device 110. The endpoint device 110 sends a request for a cookie previously stored via a web interaction. For example, the client device 104 may establish a VOIP call to the Acme Catalog IVR system, which uses VOIP session capabilities to find and retrieve cookies written during web interactions. The client device 104 verifies the authenticity of the request before sending the requested cookie to the endpoint device 110. To verify authenticity, the client device 104 may compare the domain of a web host stored in the cookie with the domain of the SIP URI to which the VOIP call was placed. The request is classified as being authentic if the domains match. This assumes that the endpoint device and web host share the same domain (e.g., the Acme Catalog uses the same domain for both Web and VOIP interactions).

Alternatively, the cookie may include both an identifier for a web host (e.g., a web domain) and an identifier for a VOIP endpoint (e.g., a VOIP domain, SIP URI, phone number, etc.). When the web application writes a cookie, it includes both a web identifier and a VOIP identifier in the cookie. During a subsequent VOIP call, the client device may validate a request for the cookie by comparing the identifier of the endpoint device 110 with that stored in the cookie by the web application. If they match, then the request is classified as authentic.

Likewise, cookies stored in the client device 104 during VOIP interactions may be used during web interactions. Assume the client device 104 establishes a VOIP call and a cookie is stored during the VOIP interaction. Subsequently, the client device 104 establishes a web session and receives a request for the cookie from the host. The client device 104 may validate the request as described above. That is, the client device 104 may compare an identifier in the cookie with that provided by the web host to determine if the request is authentic. Notably, if the cookie includes both a web identifier and a VOIP identifier, the endpoint device 110 must write both identifiers in the cookie for subsequent web and/or VOIP interactions.

In the VOIP/web interactions described above, it is assumed that a single cookie is employed that can be used for both types of interactions. However, it is not necessary that a web host or a VOIP endpoint write to a single cookie. That is, the VOIP endpoint may establish a VCookie and a web cookie on the client device 104. Likewise, the web host may establish a web cookie and a VCookie on the client device.

VCookies, web cookies, and VOIP/web combination cookies may be stored and retrieved from any type of client device capable of storing the cookie data 212. Alternatively, the cookie data 212 and the VOIP application 210 for handling the cookie data 212 may be stored by the gateway 106. In the gateway 106, the VOIP application 210 may be adapted to provide synchronization for sharing cookies among client devices so that VCookies, web cookies, or VOIP/web cookies can be exchanged among client devices.

Figure 3:
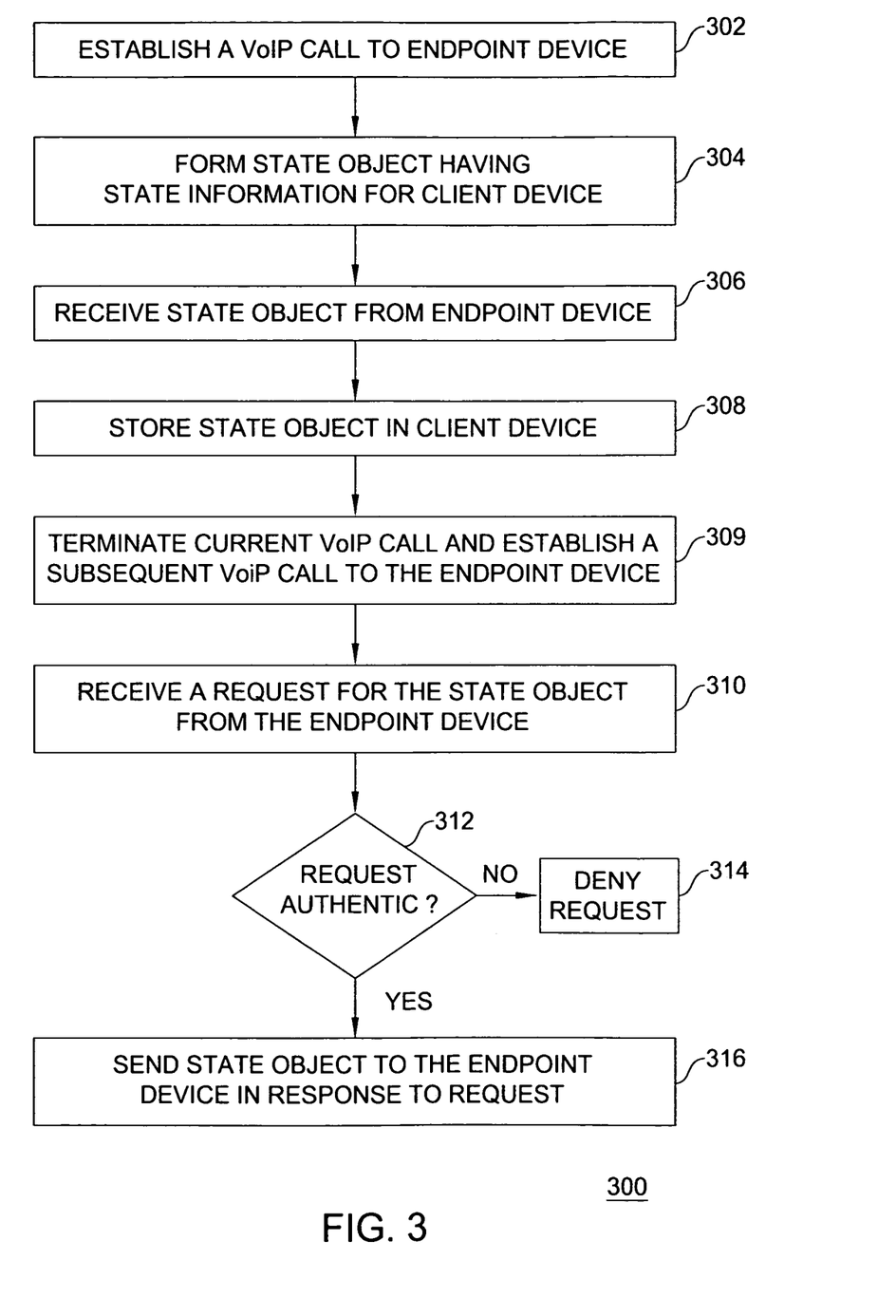
FIG. 3 is a flow diagram depicting an exemplary embodiment of a method of maintaining state information on a client device configured for VOIP communication in accordance with one or more aspects of the invention.

FIG. 3 is a flow diagram depicting an exemplary embodiment of a method 300 of maintaining state information on a client device configured for VOIP communication in accordance with one or more aspects of the invention. The method 300 begins at step 302, where a VOIP call is established to an endpoint device. At step 304, state information associated with the client device is packaged into a state object at the endpoint device during the VOIP call. At step 306, a state object is received from the endpoint device. The state object includes the state information embedded therein. For example, the state object may comprise a VCookie. At step 308, the state object is stored in the client device. At 310, a request for the state object is received from the endpoint device. The request may be received during the VOIP call session established at step 302. Alternatively, at optional step 309, the current VOIP call session may be terminated and a subsequent VOIP call session established to the endpoint device. In either case, at step 312, a determination is made whether the request is authentic. If not, the method 300 proceeds to step 314, where the request is denied. Otherwise, the method 300 proceeds to step 316, where the state object is sent to the endpoint device in response to the request.

Figure 4:
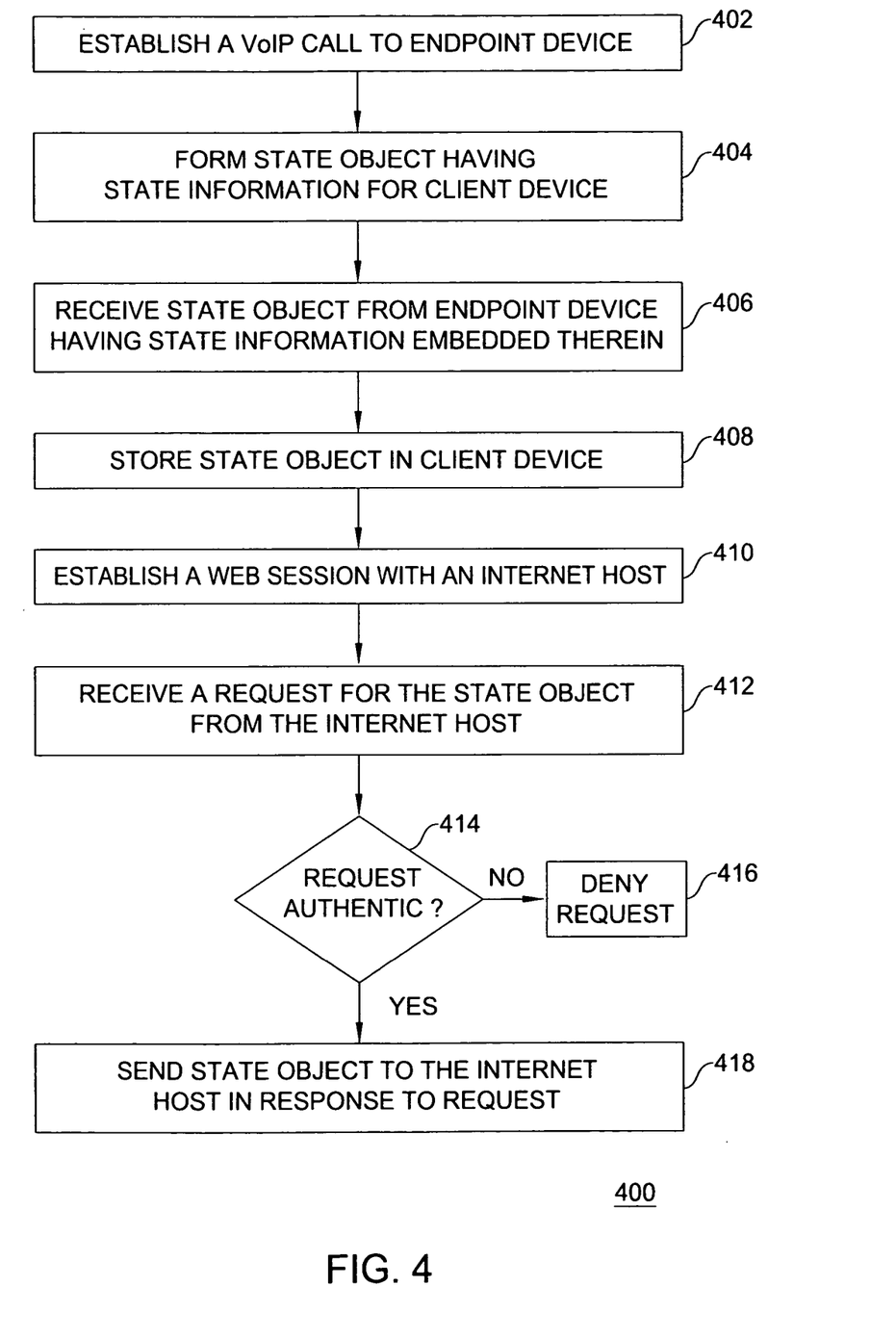
FIG. 4 is a flow diagram depicting another exemplary embodiment of a method of maintaining state information on a client device configured for VOIP communication in accordance with one or more aspects of the invention.

FIG. 4 is a flow diagram depicting another exemplary embodiment of a method 400 of maintaining state information on a client device configured for VOIP communication in accordance with one or more aspects of the invention. The method 400 begins at step 402, where a VOIP call is established to an endpoint device. At step 404, state information associated with the client device is packaged into a state object at the endpoint device during the VOIP call. At step 406, a state object is received from the endpoint device. The state object includes the state information embedded therein. For example, the state object may comprise a web/VOIP cookie or separate VCookie and web cookie. At step 308, the state object is stored in the client device. At step 410, a web session is established with an Internet host. At step 412, a request is received for the state object from the Internet host. At step 414, a determination is made whether the request is authentic. If not, the method 400 proceeds to step 416, where the request is denied. Otherwise, the method 400 proceeds to step 418, where the state object is sent to the Internet host in response to the request.

Figure 5:
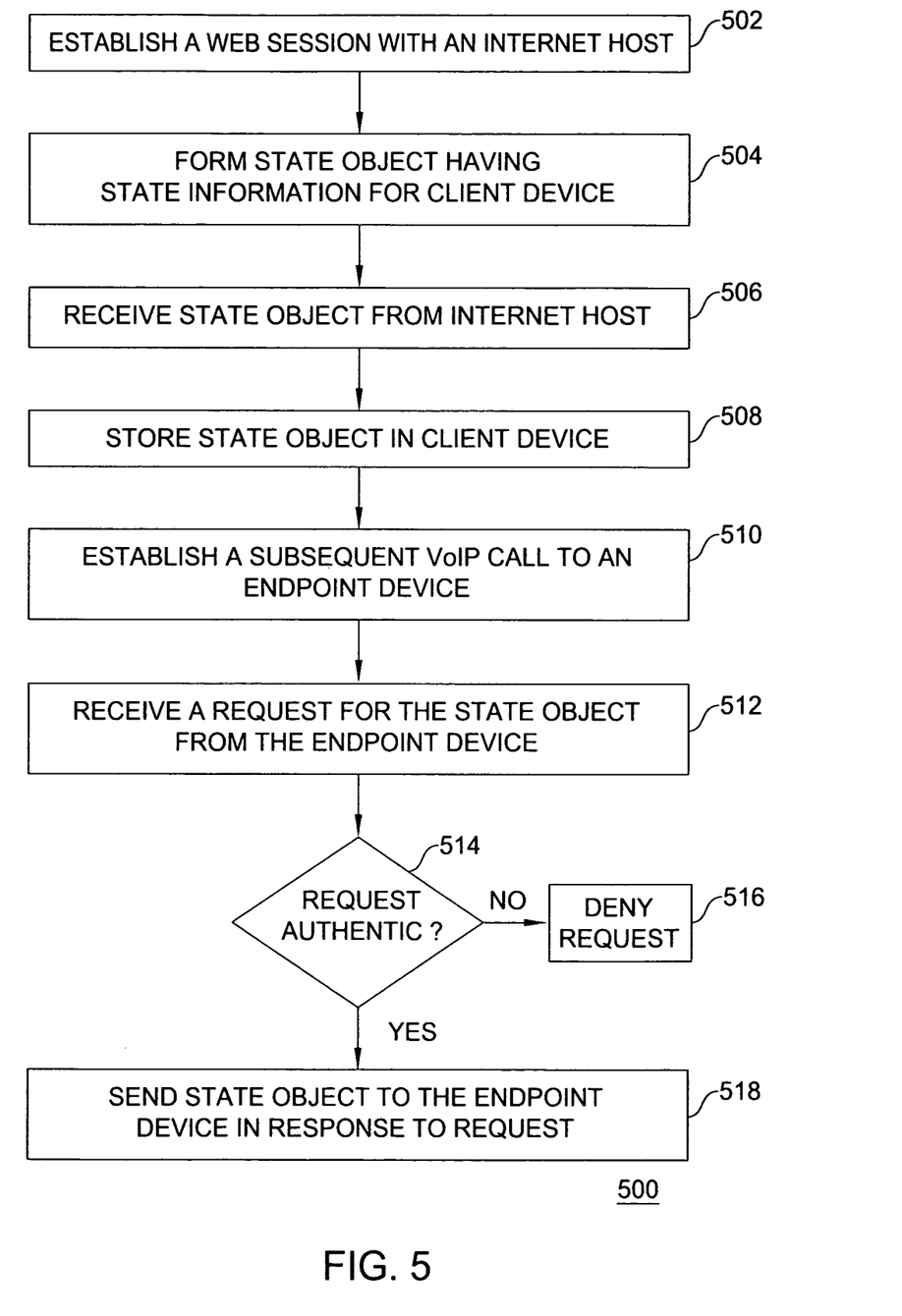
FIG. 5 is a flow diagram depicting another exemplary embodiment of a method of maintaining state information on a client device configured for VOIP communication in accordance with one or more aspects of the invention.

FIG. 5 is a flow diagram depicting another exemplary embodiment of a method 500 of maintaining state information on a client device configured for VOIP communication in accordance with one or more aspects of the invention. The method 500 begins at step 502, where a web session is established to an Internet host. At step 504, state information associated with the client device is packaged into a state object by the host during the web session. At step 506, a state object is received from the Internet host. The state object includes the state information embedded therein. For example, the state object may comprise a web/VOIP cookie or separate VCookie and web cookie. At step 508, the state object is stored in the client device. At step 510, a VOIP call is established with an endpoint device. At step 512, a request is received for the state object from the endpoint device. At step 514, a determination is made whether the request is authentic. If not, the method 500 proceeds to step 516, where the request is denied. Otherwise, the method 500 proceeds to step 518, where the state object is sent to the Internet host in response to the request.

While the foregoing is directed to embodiments of the present invention, other and further embodiments of the invention may be devised without departing from the basic scope thereof, and the scope thereof is determined by the claims that follow.

The invention claimed is:

1. A method of maintaining state information on a client device configured for voice over internet protocol communication through a packet network, comprising:
    receiving a state object from an endpoint device of a called party at the client device of a calling party, wherein the state object was formed by packaging state information associated with the client device by the endpoint device during a voice over internet protocol call, wherein the state information comprises a name of a user, wherein the state object comprises a cookie, and wherein the state information is embedded as text within the cookie;

storing the state object in the client device of the calling party;

receiving, by the client device of the calling party, a request for the state object from the endpoint device of the called party during a subsequent voice over internet protocol call placed at a later time;

verifying, by the client device of the calling party, an authenticity of the request;

sending, by the client device of the calling party, the state object to the endpoint device of the called party in response to the request if the request is verified as authentic; and establishing a web session between the client device of the calling party and a host subsequent to the voice over internet protocol call;

receiving a second request for the state object from the host during the web session;

verifying an authenticity of the second request; and sending the state object to the host in response to the second request if the second request is verified as authentic.

2. The method of claim 1, wherein the verifying comprises:

comparing an identifier associated with the endpoint device of the called party with an identifier stored in the state object; and classifying the request as authentic if the identifier in the request matches the identifier stored in the state object.

3. The method of claim 1, wherein the receiving the state object comprises:

receiving a communication protocol message having the state object embedded therein.

4. The method of claim 3, wherein the communication protocol comprises a session initiation protocol.

5. The method of claim 3, wherein the communication protocol comprises an H.323 protocol.

6. The method of claim 3, wherein the communication protocol comprises a media gateway control protocol.

7. A method of maintaining state information on a client device configured for voice over internet protocol communication through a packet network, comprising:

storing a state object in the client device of a calling party received from a host on the packet network during a web session, wherein the state object is formed by packaging the state information associated with the client device, wherein the state information comprises a name of a user, wherein the state object comprises a cookie, and wherein the state information is embedded as text within the cookie;

receiving, by the client device of the calling party, a request for the state object stored in the client device of the calling party from an endpoint device of a called party during a subsequent voice over internet protocol call placed at a later time;

verifying, by the client device of the calling party, an authenticity of the request;

sending, by the client device of the calling party, the state object to the endpoint device of the called party in response to the request if the request is verified as authentic; and wherein the storing comprises:

establishing the web session between the client device of the calling party and the host;

sending the state information from the client device to the host during the web session; and receiving the state object having the state information embedded therein from the host at the client device of the calling party.

8. The method of claim 7, wherein the cookie includes a web portion and a voice over internet protocol portion.

9. The method of claim 7, wherein the verifying comprises:

comparing an identifier associated with the endpoint device of the called party with an identifier stored in the state object; and classifying the request as authentic if the identifier in the request matches the identifier stored in the state object.

10. The method of claim 7, wherein the sending the state object comprises:

sending a communication protocol message having the state object embedded therein.

11. The method of claim 10, wherein the communication protocol comprises a session initiation protocol.

12. A client device for maintaining state information, wherein the client device is configured for voice over internet protocol communication through a packet network, comprising:

a processor; and a computer-readable medium in communication with the processor, wherein the computer readable medium has stored thereon storing a plurality of instructions, the plurality of instructions including instructions which, when executed by the processor, cause the processor to perform operations, the operations comprising:

receiving a state object from an endpoint device of a called party at the client device of a calling party, wherein the state object was formed by packaging state information associated with the client device by the endpoint device during a voice over internet protocol call, wherein the state information comprises a name of a user, wherein the state object comprises a cookie, and wherein the state information is embedded as text within the cookie;

storing the state object in the client device of the calling party;

receiving a request for the state object from the endpoint device of the called party during a subsequent voice over internet protocol call placed at a later time;

verifying an authenticity of the request;

sending the state object from the client device of the calling party to the endpoint device of the called party in response to the request if the request is verified as authentic; and establishing a web session between the client device of the calling party and a host subsequent to the voice over internet protocol call;

receiving a second request for the state object from the host during the web session;

verifying an authenticity of the second request; and sending the state object to the host in response to the second request if the second request is verified as authentic.

13. The client device of claim 12, wherein the verifying comprises:

comparing an identifier associated with the endpoint device of the called party with an identifier stored in the state object; and classifying the request as authentic if the identifier in the request matches the identifier stored in the state object.

14. The client device of claim 12, wherein the receiving the state object comprises:

receiving a communication protocol message having the state object embedded therein.

* * * * *